United States Patent [19]

Muller

[11] Patent Number: 5,920,851
[45] Date of Patent: Jul. 6, 1999

[54] METHOD FOR GENERATING A REPRESENTATION OF AN ENVIRONMENT

[75] Inventor: Robert U. Muller, Glenwood Landing, N.Y.

[73] Assignee: The Research Foundation of State University of NY, Albany, N.Y.

[21] Appl. No.: 08/227,951

[22] Filed: Apr. 15, 1994

Related U.S. Application Data

[63] Continuation-in-part of application No. 07/744,590, Aug. 13, 1991, abandoned.

[51] Int. Cl.$^6$ ..................................................... G06F 15/18
[52] U.S. Cl. ................................................ 706/20; 706/29
[58] Field of Search .................................. 395/22, 23, 24; 706/20, 29

[56] References Cited

U.S. PATENT DOCUMENTS

| | | | |
|---|---|---|---|
| 4,518,866 | 5/1985 | Clymer | 706/34 |
| 4,807,168 | 2/1989 | Moopenn et al. | 706/37 |
| 4,884,216 | 11/1989 | Kuperstein | 706/23 |
| 4,903,226 | 2/1990 | Tsividis | 706/33 |
| 4,918,617 | 4/1990 | Hammerstrom et al. | 706/26 |
| 4,950,917 | 8/1990 | Holler et al. | 706/38 |
| 4,951,239 | 8/1990 | Andes et al. | 364/807 |
| 4,962,342 | 10/1990 | Mead et al. | 706/33 |
| 4,972,187 | 11/1990 | Wecker | 341/95 |
| 4,994,982 | 2/1991 | Duranton et al. | 706/41 |
| 4,996,648 | 2/1991 | Jourjine | 706/40 |
| 5,003,490 | 3/1991 | Castelaz et al. | 706/22 |
| 5,040,214 | 8/1991 | Grossburg et al. | 706/20 |
| 5,119,469 | 6/1992 | Alkon et al. | 706/25 |
| 5,130,563 | 7/1992 | Nebet et al. | 706/40 |
| 5,136,687 | 8/1992 | Edelman et al. | 706/20 |
| 5,283,839 | 2/1994 | Edelman et al. | 706/20 |
| 5,355,437 | 10/1994 | Takatori et al. | 706/20 |
| 5,361,328 | 11/1994 | Takatori et al. | 706/20 |
| 5,394,510 | 2/1995 | Takatori et al. | 706/20 |
| 5,402,522 | 3/1995 | Alkon et al. | 706/25 |
| 5,485,546 | 1/1996 | Rubenstein et al. | 706/29 |

OTHER PUBLICATIONS

Sharp P.E., "Computer–Simulation of Hippocampal Place Cells", Psychobiology, 1991 (abstract).
J. Alspector, IEEE Communications Magazine, pp. 29–36 (Nov. 1989).
I. Amato, Science News 131: 60–61 (Jan. 1987).
J.J. Hopfield, Proc. Natl. Acad. Sci. USA 79: 2554–2558 (1982).
J.J. Hopfield and D.W. Tank, Science 233: 625–633 (1986).
O. Rossetto et al., IEEE MICRO, pp. 56–63 (Dec. 1989).
M. Verleysen and P.G.A. Jespers, IEEE MICRO, pp. 46–55 (Dec. 1989).
D.G. Amaral and M.P. Witter, Neuroscience 31: 571–591 (1989).
E. Bostock et al., Neuroscience, Abstr. 18: 127 (1988) [Abstract 51.7].
J.L. Kubie and J.B. Ranck, in "Neuropsychology of Memory", Eds. L.R. Squire and N. Butters, Guilford Press, New York (1984) pp. 417–423.
T.H. Brown et al., in "Neural Models of Plasticity", Eds. J.H. Byrne and W.O. Berry, Academic Press, Inc., San Diego (1989) pp. 266–306.

(List continued on next page.)

*Primary Examiner*—Robert W. Downs
*Attorney, Agent, or Firm*—Heslin & Rothenberg, P.C.

[57] ABSTRACT

The invention provides for the use of synaptic strengths to reflect the connectivity of local space to give a topological representation. Synaptic strengths are zeroed and the mobile entity's position is initialized. A probability of firing (P) is calculated from the spatial firing pattern of each cell. A cell fires if P is higher than a random number. The mobile entity's position is updated from a record of real motions and firing is again determined. Synapses between cells that both fire within 250 msec are strengthened. Synapses between cells with overlapping fields increase in strength whereas synapses between cells with distant fields will stay weak.

18 Claims, 5 Drawing Sheets

OTHER PUBLICATIONS

B.L. McNaughton, in "Neural Connections, Mental Computation", Eds. L. Nadel et al., MIT Press, Cambridge, Massachusetts (1989) pp. 285–350.

R. Miles and R.K.S. Wong, J. Physiol. 373: 397–418 (1986).

R.G.M. Morris, Learning and Motivation 12: 239–260 (1981).

R.U. Muller and J.L. Kubie, J. Neuroscience 7: 1951–1968 (1987).

J. O'Keefe, Progress in Neurobiology 13: 419–439 (1979).

J. O'Keefe and J. Dostrovsky, Brain Research 34: 171–175 (1971).

J. O'Keefe and A. Speakman, Exp Brain Res 68: 1–27 (1987).

G.J. Quirk et al., J. Neuroscience 10: 2008–2017 (1990).

P.E. Sharp et al., J. Neuroscience 10: 3093–3105 (1990).

L.T. Thompson and P.J. Best, J. Neuroscience 9: 2382–2390 (1989).

Disclosure Bulletin C–853, "A Method of Using a Neural Network to Increase the Efficiency of Robot Mobility" of The Research Foundation of State University of New York—Technology Transfer Office (AEKS/M Jun. 1, 1991).

fig. 1 fig. 2 fig. 3 fig. 4 fig. 5

METHOD FOR GENERATING A REPRESENTATION OF AN ENVIRONMENT

This application is a continuation-in-part of U.S. Ser. No. 07/744,590, filed Aug. 13, 1991, now abandoned, the contents of which is hereby incorporated by reference in its entirety into the subject application.

This invention was made with support under the National Institute of Health Grant No. 5R01NS20686 and No. 5R01NS14497. Accordingly, the U.S. Government has certain rights in this invention.

FIELD OF THE INVENTION

This invention relates to neural networks and more particularly to a method of using a neural network based on hippocampus cells to generate a representation of an environment.

BACKGROUND OF THE INVENTION

The ability to recognize patterns is a major step towards the development of artificial systems and mobile entities, such as robots, that are capable of performing perceptual tasks that currently only biological systems can perform. Speech and visual pattern recognition are two areas in which conventional computers are seriously deficient. In an effort to develop artificial systems that can perform these and other tasks, new methods based on neural models of the brain are being developed to perform perceptual tasks. These systems are known variously as neural networks, neuromorphic systems, learning machines, parallel distributed processors, self-organizing systems, or adaptive logic systems. Whatever the name, these models utilize numerous nonlinear computational elements operating in parallel and arranged in patterns reminiscent of biological neural networks. Each computational element or "neuron" is connected via weights or "synapses" that typically are adapted during training to improve performance. Thus, these systems exhibit self-learning by changing their synaptic weights until the correct output is achieved in response to a particular input. Once trained, neural nets are capable of recognizing a target and producing a desired output even where the input is incomplete or hidden in background noise. Also, neural nets exhibit greater robustness, or fault tolerance, than conventional sequential computers because there are many more processing nodes, each with primarily local connections. Damage to a few nodes or links need not impair overall performance significantly.

There is a wide variety of neural net models utilizing various topologies, neuron characteristics, and training or learning rules. Learning rules specify an internal set of weights and indicate how weights should be adapted during use, or training, to improve performance. By way of illustration, some of these neural net models include the Perceptron, described in U.S. Pat. No. 3,287,649 issued to F. Rosenblatt; the Hopfield Net, described in U.S. Pat. Nos. 4,660,166 and 4,719,591 issued to J. Hopfield; the Hamming Net and Kohohonen self-organizing maps, described in R. Lippman, "An Introduction to Computing with Neural Nets", IEEE ASSP Magazine, April 1987, pages 4–22; and the Generalized Delta Rule for Multilayered Perceptrons, described in Rumelhart, Hinton, and Williams, "Learning Internal Representations by Error Propagation", in D. E. Rumelhart and J. L. McClelland (Eds.), Parallel Distributed Processing; Explorations in the Microstructure of Cognition. Vol. 1: Foundations. MIT Press (1986).

Neural networks are discussed in each of the following U.S. Patents, the contents of each of which are hereby incorporated by reference in order to more fully describe the state of the art to which the subject invention pertains:

U.S. Pat. No. 4,807,168 issued Feb. 21, 1989 (Moopenn et al.).

U.S. Pat. No. 4,884,216 issued Nov. 28, 1989 (Kuperstein).

U.S. Pat. No. 4,903,226 issued Feb. 20, 1990 (Tsividis).

U.S. Pat. No. 4,918,617 issued Apr. 17, 1990 (Hammerstrom et al.).

U.S. Pat. No. 4,950,917 issued Aug. 21, 1990 (Holler et al.).

U.S. Pat. No. 4,951,239 issued Aug. 21, 1990 (Andes et al.).

U.S. Pat. No. 4,962,342 issued Oct. 9, 1990 (Mead et al.).

U.S. Pat. No. 4,972,187 issued Nov. 20, 1990 (Wecker).

U.S. Pat. No. 4,994,982 issued Feb. 19, 1991 (Duranton et al.).

U.S. Pat. No. 4,996,648 issued Feb. 26, 1991 (Jourjine).

U.S. Pat. No. 5,003,490 issued Mar. 26, 1991 (Castelaz et al.).

REFERENCES

Ammeraal, L. (1987). Programs and data structures in C. Wiley and Sons, Ltd., Chichester, U. K.

Amaral, D. G., and M. P. Witter (1989). The three dimensional organization of the hippocampal formation: a review of anatomical data. *Neuroscience* 31:571–591.

Bostock, E., J. Taube, and R. U. Muller (1988). The effects of head orientation on the firing of hippocampal place cells. *Neurosci, Abstr.* 18:127.

Harary, F. (1972). Graph theory. Addison-Wesley. Reading, Mass.

Kubie, J. L., and J. B. Ranck, Jr. (1984). Hippocampal Neuronal Firing, Context, and Learning, in *Neuropsychology of Memory*, (Eds. L. R. Squire and N. Butters), Guilford Press, New York.

Brown, T. H., Kairass, Ganong, A. H., Kairass, E. W., Keenan, C. L. and Kelso, S. R. Long-term potentiation in two synaptic systems of the hippocampal brain slice. In *Neural models of plasticity*. (Eds. J. H. Byrne and W. O. Berry). Academic Press, San Diego.

McNaughton, B. L. (1989). Neuronal mechanisms for spatial computation and information storage. In *Neural connections, mental computation.*, (Eds. Nadel, L., L. A. Cooper, P. Culicover and R. M. Harnish). MIT Press, Cambridge, Mass., pp. 285–350.

Miles, R. and R. K. S. Wong (1986). Excitatory synaptic connections between CA3 neurones in the guinea pig hippocampus. *J. Physiol* (Long.). 373:397–418.

Morris, R. G. M. (1981). Spatial localization does not require the presence of local cues. *Learn and Motiv.* 12:239–260.

Muller, R. U., and J. L. Kubie (1987). The effects of changes in the environment on the spatial firing of hippocampal complex-spike cells. *J. Neurosci.* 7:1951–1968.

O'Keefe, J. (1979). A review of the hippocampal place cells. *Prog. Neurobiol.* 13:419–439.

O'Keefe, J., and J. Dostrovsky (1971). the hippocampus as spatial map. Preliminary evidenced from unit activity in the freely moving rat. *Brain res.* 34:171–175.

O'Keefe, J., and L. Nadel (1978). *The hippocampus as a cognitive map*, Clarendon Press, London.

O'Keefe, J. and A. Speakman (1987). Single unit activity in the rat hippocampus during a spatial memory task. *Exp. Brain. Res.* 68:1–27.

Quirk, G. J., Muller, R. U. and Kubie, J. L. (1990). The firing of hippocampal place cells in the dark depends on the rat's recent experience. *J. Neurosci.* 10:2008–2017.

Sharp, P. E., Kubie, J. L. and Muller, R. U. (1990). Properties of hippocampal neurons in a visually symmetric environment: Contributions of multiple sensory cues and mnemonic processes. *J. Neurosci.* 10:3093–3105.

Thompson, L. T., and P. J. Best (1989). Place cells and silent cells in the hippocampus of freelybehaving rats. *J. Neurosci.* 9:2382–2390.

Despite the numerous neural networks which have been described, the need still exists for a neural network which can be used to generate a representation of an environment to be used in navigation.

SUMMARY OF THE INVENTION

Accordingly, it is a principle object of the present invention to provide a method for generating a representation of an environment. The method comprises selecting an environment to be represented by a plurality of cells repositionable as a unit within the environment. Each cell is connected to one or more other cells by a synapse, wherein two cells are designated as a pre synaptic cell and a post synaptic cell. Each cell has a firing field within the environment and fires when the plurality of cells are located within the firing field of the cell. A determination is made whether the pre synaptic cell in the environment has fired within a first preselected time interval. The pre synaptic cell that has fired is designated as a fired pre synaptic cell. A determination is also made as to whether the post synaptic cell has fired within a second preselected time interval. The synapse connecting the fired pre synaptic cell to the post synaptic cell has a synaptic strength value. The synaptic strength value is increased if the post synaptic cell has fired. For other pairs of cells, a determination of whether the pre synaptic cell has fired, the designation of a fired pre synaptic cell, the determination of whether the post synaptic cell has fired and the increasing of the synaptic strength value is repeated. A spatial relationship with respect to the environment is encoded using the synaptic strength values so as to generate a representation of the environment from the spatial relationship.

In another embodiment of the invention, a method for generating a representation of an environment is provided. An environment to be represented by a plurality of cells is selected. Each cell is connected to one or more other cells by a synapse, wherein two cells are designated as a pre synaptic cell and a post synaptic cell. Each cell has a firing field within the environment. A determination is made whether the pre synaptic cell has fired within a first preselected time interval. The pre synaptic cell that has fired is designated as a fired pre synaptic cell. A determination is also made as to whether the post synaptic cell has fired within a second preselected time interval. The synapse connecting the fired pre synaptic cell to the post synaptic cell has a synaptic strength value. The synaptic strength value is increased if the post synaptic cell has fired. For other pairs of cells, a determination of whether the pre synaptic cell has fired, the designation of a fired pre synaptic cell, the determination of whether the post synaptic cell has fired and the increasing of the synaptic strength value is repeated. A spatial relationship with respect to the environment is encoded using the synaptic strength values so as to generate a representation of the environment from the spatial relationship.

BRIEF DESCRIPTION OF THE FIGURES

These and other objects, features, and advantages of this invention will be evident from the following detailed description when read in conjunction with the accompanying drawings in which.

DETAILED DESCRIPTION OF THE INVENTION

The hippocampus guides spatial behavior (O'Keefe and Nadel, 1978). The subject invention focuses on the nature of the environmental representation that is reflected by the ensemble firing of place cells (O'Keefe and Dostrovsky, 1971). In particular, the strengths of synaptic connections among CA3 hippocampal pyramidal cells come to encode distance within a rat's surroundings. Aspects of space can be represented by a simple neural network, and is a basis for attacking the question of how rats solve difficult spatial problems (see Morris, 1981). These same techniques may also be used in the guidance systems of other mobile entities such as, for instance, robots.

The invention rests on two known properties of CA3 pyramidal cells. First, such cells act as "place cells" in a wide variety of behavioral circumstances (see O'Keefe, 1979). Place cells are characterized by "location-specific" firing. Each cell is intensely active only when the rat's head (i.e., the plurality of cells) is in a restricted part of the environment, the cell's "firing field". To a good first approximation, the discharge of place cells is independent of the rat's activity. In the cylindrical apparatus applicant has used, the firing of place cells is also independent of the rat's head direction (Bostock et al., 1988). In fixed surroundings, it is difficult to tell if location-specific firing is a reflection of the triggering of place cells by certain combinations of the sensory stimulus constellation that occur at only certain places, but this simple sensory view is belied by a variety of manipulations (Muller and Kubie, 1987; O'Keefe and Speakman, 1987; Quirk et al., 1990; Sharp et al., 1990).

The second property of CA3 pyramidal cells essential for the invention is the mesh of connections that such cells make with each other. Anatomical (Amaral and Witter, 1989) and physiological (Miles and Wong, 1986) evidence indicates that each CA3 pyramidal cell makes direct, excitatory synapses with many other CA3 pyramidal cells. When simultaneous recordings are made from pairs of CA3 pyramidal cells in slices, the probability that one is pre synaptic to the other is about 0.02. In longitudinal slices (running along the septal-temporal extent of CA3), a given cell is found to contact cells rather far away, although the probability of contact decreases with distance. These "lateral meshwork" synapses are postulated to be the site of storage of the representation.

In addition to the known features, the invention establishes that the lateral mesh synapses are modifiable. The modification mechanism is taken to be Hebbian, such that synaptic strength increases when there is the proper temporal conjunction of pre- and post synaptic action potentials.

More precisely, lateral mesh synapses show the same form of long-term potentiation exhibited by the synapses made by CA3 pyramids on CA1 pyramids.

Figure 1:
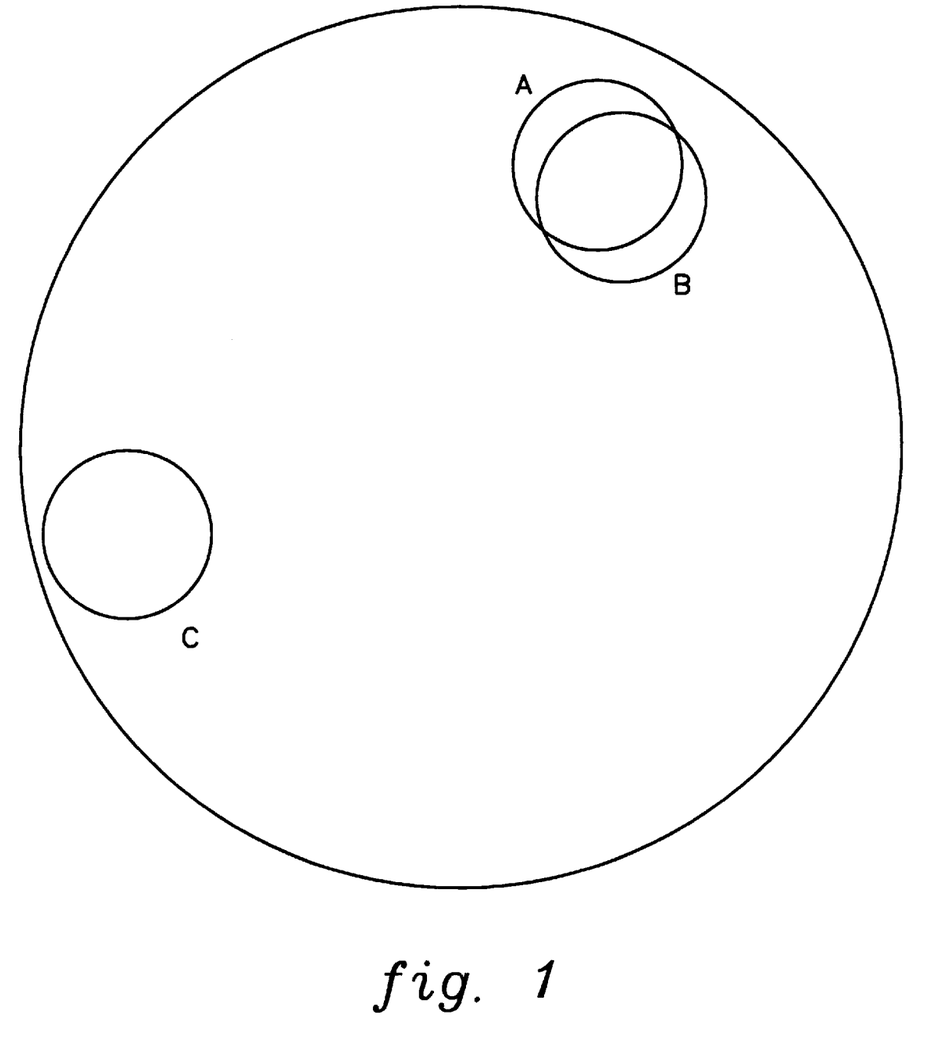
FIG. 1 shows the boundaries of a cylindrical recording apparatus containing three cells, A, B, and C. The limits of the firing fields of cells A, B, and C are shown.

The basic idea of the invention is illustrated in FIG. 1. The large circle shows the boundaries of a cylindrical recording apparatus. The small circles show the limits of the firing fields of three CA3 place cells. The fields of cells A and B overlap, whereas the field of cell C is distant from the others. Note that the locations of the cells in the CA3 surface have nothing to do with the spatial relationships among the fields; there is no topological mapping of behavioral space onto either CA3 or CA1 (Muller et al., 1987).

Cell A happens to be monosynaptically connected to both cells B and C. Under these conditions, it is expected that cells A and B will sometimes fire within a brief enough interval that the synapse from A onto B will undergo strengthening; the overlap of the firing fields is enough to insure that pre- and post synaptic action potentials will occur within the "permissive interval" for long-term potentiation (LTP). In contrast, because the mobile entity cannot move rapidly enough from the region associated with the firing field of cell A to the region associated with the field of cell C, the synapse from A onto C will remain at its initial strength; the minimal interval between pre- and post synaptic action potentials exceeds the LTP permissive interval. Thus, given the existence of place cells and modifiable lateral mesh synapses in CA3, it is only necessary for the mobile entity to move around the environment for the strength of the synapses to encode distance between firing field centers for cell pairs that happen to be connected. The lateral mesh synapses only store information; they do not co-determine the firing of post synaptic cells.

This invention has been tested with computer simulations. The number of cells in the network was varied, as was the divergence of each cell. The number of synapses is just the product of the number of cells and the divergence. In turn, the average convergence of synapses onto post synaptic cells is equal to the average divergence. In the current embodiment of the model, the divergence from each cell was a constant; the convergence onto each cell was also a constant, and so was numerically equal to the divergence.

In one computer simulation example, motions of the rat were taken from the sequence of positions observed with an automatic TV/computer rat tracker as a real rat chased small food pellets scattered into a 76 cm diameter cylinder (Muller et al., 1987). In this experiment, the cylinder is the environment. In general, the environment may be any delimited region of space in which the rat or any other mobile entity may move around. In one embodiment, this environment is distinguished from the rest of space in that the mobile entity cannot leave the environment. In another embodiment, however, the mobile entity may leave one environment to enter other environments via paths.

In this particular 76 cm cylindrical environment, position is measured in pixels; a pixel is a square about 3 cm on a side. The rat's position was updated from the position sequence at 60 Hz. Synapses were strengthened according to the Hebb-like rule:

$$S_{ji} = f_i * f_j$$

where $S_{ji}$ is the increment of the strength of the synapse made by the i-th cell onto the j-th cell, and $f_i$ and $f_j$ are the firing frequencies of the two cells averaged over the LTP permissive interval; no limits are imposed on maximum synaptic strength. The initial estimate of 300 msec for the LTP permissive interval was taken from Brown et al. (1988); no attention was paid to the asymmetric relationship between pre and post synaptic activity such that strengthening appears to be more efficient if the pre synaptic activity leads the post synaptic activity. The firing field center for each cell was randomly chosen from a list of possible positions in the apparatus. The firing field for each cell was simulated as a two-dimensional Gaussian such that the rate fell off monotonically in all directions from the field center. Each field was characterized by a peak rate at its center and a width; the rate was set to zero for all pixels in which the rate was lower than 1.0 action potential per second. The action potential sequence for each cell was determined from the firing rate associated with the rat's current position; a cell "fired" if a properly scaled random number was lower than the cell's expected rate for a 1/60th second interval. It will be apparent to one skilled in the art that the rat in the environment may be replaced by any being with cells, or equivalent, such as, for example, a robot or any other mobile entity containing, or attached to, a plurality of cells (in for example, a brain or a processor).

Figure 2:
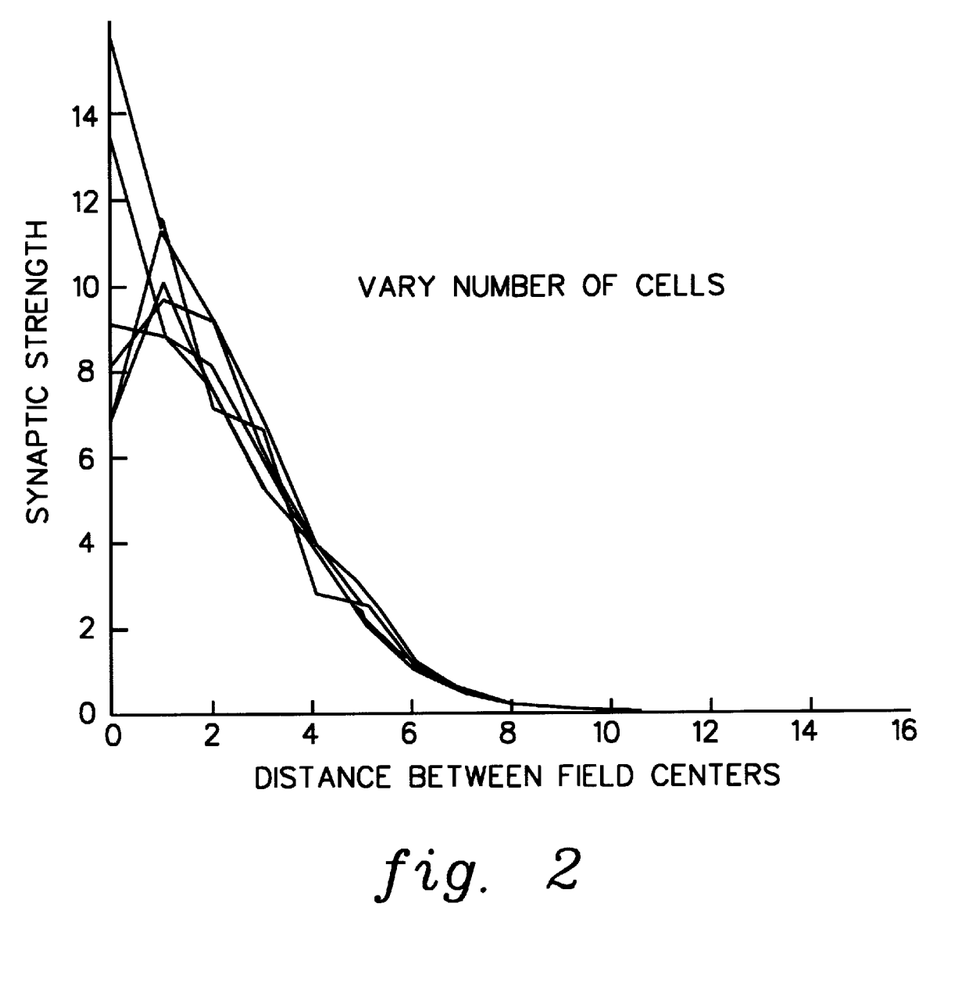
FIG. 2 shows the relationship between synaptic strength and distance between field centers for networks with different number of cells.

FIG. 2 shows the relationship between synaptic strength and distance between field centers for networks with different numbers of cells (range 100 to 3600). In each case, the divergence was 8, so that the number of synapses is proportional to the number of cells. The synaptic strength is the average for all connected cell pairs such that the distance (D) between their field centers is in the range (d) D<d+1, where d is an integer. The lowest possible value of d is zero; the highest is one pixel less than the diameter of the cylinder. There is a strong, monotonic decrease of synaptic strength with distance. The strength/distance function is the same for all network sizes, since each synapse is an independent storage unit. For the same reasons, the strength/distance function is unchanged if the divergence is varied while holding the number of cells constant (not shown).

Figure 3:
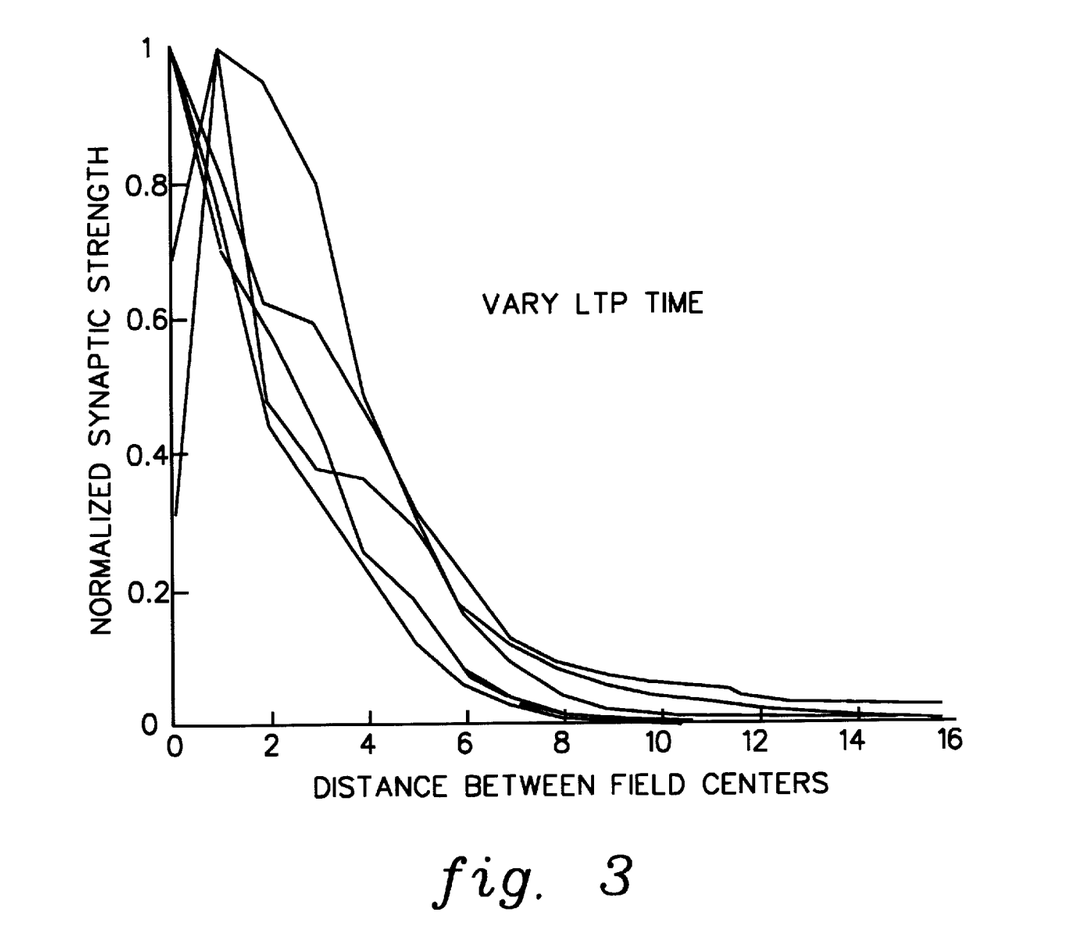
FIG. 3 shows the effects of varying the duration of the LTP permissive time over the range 60–2,000 msec.
Figure 4:
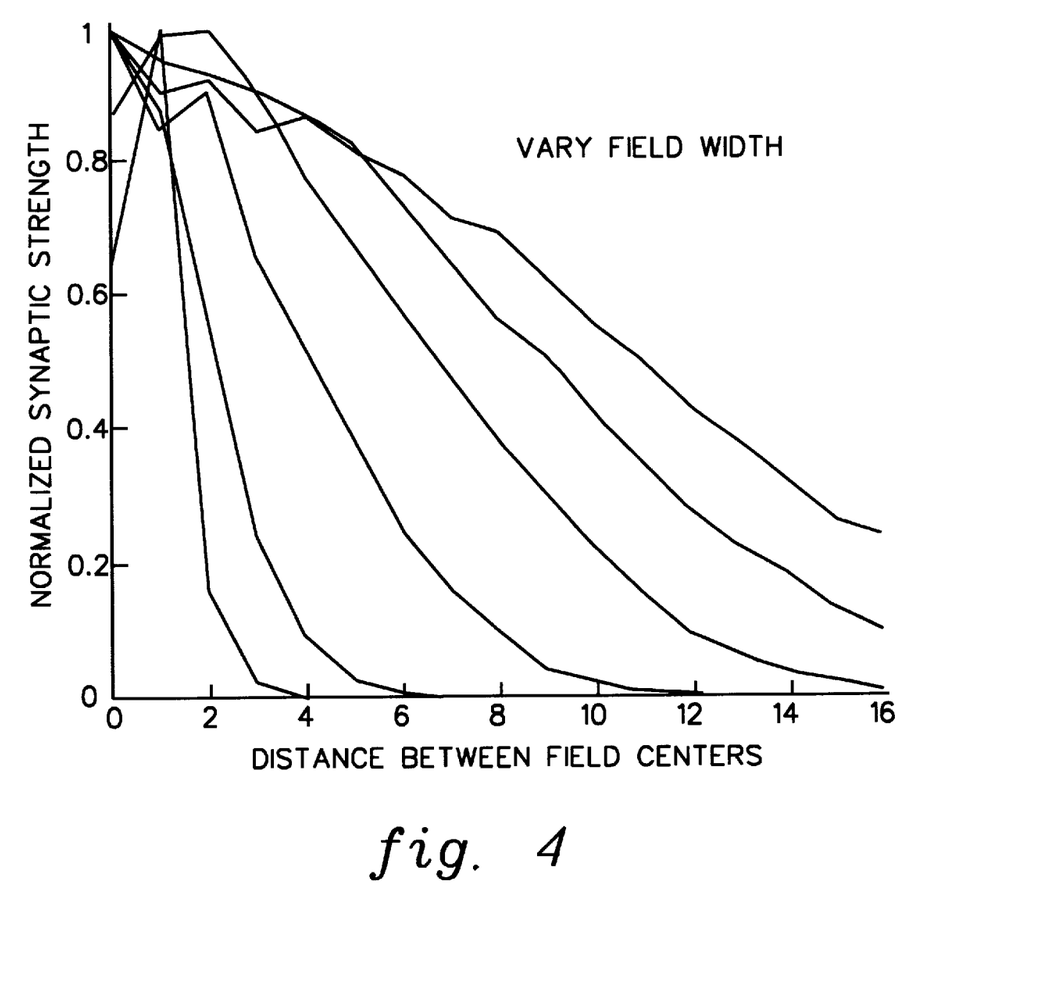
FIG. 4 shows the effect of varying field width over the range 2–15 pixels.

The effects of varying the duration of the LTP permissive time over the range 60 to 2000 msec are shown in FIG. 3. The curves are normalized to the maximum synaptic strength for each LTP time. For small distances, there is no clear trend, but at distances greater than about 5 pixels long LTP times are associated with somewhat greater synaptic strength. The rather weak effects of changing LTP time stands in contrast to the stronger effect of varying field width over the range 2 to 15 pixels as shown in FIG. 4; again the curves are normalized to the maximum synaptic strength for each field width. It is clear that synaptic strength increases rather rapidly with field width at constant distance. The demonstrated strength/distance functions using LTP time and field width as parameters are expected, but the relative effects of the two parameters was surprising. Preliminary simulations in which running speed is varied by modifying the position sequence are also in agreement; if the running speed is higher, the strength/distance function is broader.

Thus, the invention predicts the nature of the relationship between synaptic strength and the distance between the field centers of connected cells. It also predicts how the relationship is affected by several important variables. The connectivity of CA3 place cells can represent the connectivity of the environment, and the information contained in the lateral mesh synapses is sufficient to reconstruct the layout of the environment.

Several comments may be made about the general nature of the invention. First, it is extremely easy to understand. Indeed, something along the proposed lines must happen if the lateral mesh synapses are modifiable. Second, the invention is parsimonious; it allows for a representation of the environment using only a small fraction of the neural machinery that is involved in guiding spatial behavior.

Third, the invention is distinct from other proposals about how place cells represent space; it bears little resemblance to either the stimulus-response association model of McNaughton (1989) or the Euclidian model of O'Keefe (1989). The representation has the form of a "directed graph" (see, for example, Harary, 1972) rather than a list of local views and paths (McNaughton, 1989) or a map (O'Keefe, 1989). In this analogy, the cell bodies plus dendrites are nodes of the graph and the axons are edges. The graph is directed because information flow is one-way along the axons and across synaptic clefts. The notion that the network is a directed graph is potentially valuable because directed graphs are routinely used as the algorithmic basis for solving critical path problems (Ammeraal, 1987).

The strength/distance representation stores adequate information to reconstruct the mobile entity's (e.g., a rat's) surroundings. The representation can be used to find optimal (critical) paths from the mobile entity's current position to a goal. This may be accomplished using isomorphisms between connectivity in the network and the structure of the environment. For example, short chains of cells are probably preferentially associated with short trajectories. If this is true, short trajectories might correspond to neural chains in which the ability of cells with fields in the starting position to activate cells with fields at the goal is maximized.

Multiple environments can be represented in the lateral network with minimal interference among the supposedly independent strength/distance functions. Clearly, if every CA3 place cell were active in each environment, synaptic strength would tend to become homogeneous as the number of environments increases. It is a remarkable property of the place cell population, however, that only a small fraction of the units (the "active subset") have firing fields in any given environment (Kubie and Ranck, 1984; Muller and Kubie, 1987; Thompson and Best, 1989); the preponderance of cells are virtually silent everywhere in the apparatus. In addition, the active subset and its complement are stable in time; each active cell has the same firing field whenever the mobile entity returns to a familiar environment, and each inactive cell is reliably silent. Finally, the cells in the active subset and their field locations appear to be independent if environments are "sufficiently different".

It is our contention that each active subset is associated with its own set of weights for the lateral mesh synapses, and that the sets of synaptic weights are independent because the active subsets are independent. In this view, the active subset is a real unit of hippocampal organization. The effective size of the hippocampal network is reduced proportionally to $P_a$ where $P_a$ is the probability that a cell is in the active subset, and the number of potentially modifiable synapses is reduced proportionally to $(P_a)^2$. In other words, if $P_a=0.1$, a reasonable value from the work of Thompson and Best (1989), the number of cells is only 10% of the size of the population and the number of synapses that can possibly be modified is only 1% of all the lateral synapses. It is possible to keep representations independent because each representation utilizes only a small, independent fraction of the storage capacity of the CA3 lateral synapses. Under the extreme constraint that a synapse is never used in more than one representation, the entire lateral network can store at most 100 representations. Despite the small fraction of synapses involved in each representation, the number is quite large. If the number of CA3 cells in one hemisphere is 250,000 the connectivity of the environment is stored in 2,500 synapses. Thus, the representations may be detailed as well as independent.

The above described invention is also applicable to the design of a guidance system for an independent mobile entity such as a robot. A neural network comprised of 'cells' can be created in the robot's memory. The robot's programming enables these cells to emulate the function of the CA3 'space cells' in the hippocampus of a rat. Such a program is similar to the aforementioned computer simulation; however, in a robot, real-time sensory input is used instead of deriving positional information from an automatic video based tracking system.

A robot with a CA3 'space cell' neural network is analogous to the rat in many ways. Both creatures are independent mobile entities exploring an environment. The aforementioned rat environment was a cylinder in which food was sporadically made available, however for a robot, could be any area of defined space such as a room, an undersea cave, or the surface of a planet. Environmental limitations are only imposed by the physical capabilities of the robot.

The robot and the rat both possess CA3 'cells'. In the case of a rat these are neurons, in a robot, these are a computer programmed implementation. In various embodiments, the robot could use any form of electronic neural network such as a general purpose programmed computer, neural network chips, or any other future neuron emulation technology that may become available. Both the robot and the rat are mobile, which means their 'cells' are mobile as well. In a rat, this is the brain. In a robot, this is the device emulating neural function such as, for example, a processor. In both cases, the cells are repositionable within the environment as a unit. In particular, as the mobile entity such as the rat or robot moves, the cells move and are repositioned within the environment. This is due to the fact that the 'brain' moves with the mobile entity.

In alternative embodiments, a robot may be controlled by a remote computer. The 'brain' containing the 'cells' would therefore be outside the environment and would not be moving around the environment with the robot. Nonetheless, the computer would receive positional information from the robot and could generate a representation of the environment based upon this information.

The ability to represent multiple environments is enhanced in the robotic implementation of this invention. It has been illustrated how multiple environments are represented by a biological CA3 cell structure. This is however limited by the overall number of cells that the rat has. In a robotic implementation, the number of environments is only limited by the amount of memory accessible by the robot. Furthermore, the data representing a new environment may be transferred into a robot from another robot or computer, enabling a robot to be familiar with an environment where it has never been. Similarly, a robot that has 'learned' an environment may transfer this information to another robot or computer.

The invention will be more fully understood by the following description of the most preferred embodiment.

Terminology

"Nerve cells" or "neurons" are the basic structural elements of the nervous system. Computations are done by groups of neurons. For this to be possible, neurons must make functional connections with each other; these connections are called "synapses". The extent to which the activity in one cell (the pre synaptic cell) influences the activity in a cell that it contacts (the post synaptic cell) is called the "synaptic strength". A given pre synaptic cell generally contacts many post synaptic cells and the strength of each of these synapses is independent of the others. A synapse may be fixed in strength, or it may be modifiable. If the synapse strengthens when the pre and post synaptic cells are active at the same time or nearly the same time, the synapse is often referred to as "Hebbian". Neurons, synapses, hebbian behavior, and other functional and structural representations of a nervous system may be emulated by computer for use in robotic environments.

The invention provides for a representation of a rat's current environment to be stored in the Hebbian synapses made among a set of cells in the rat's hippocampus. Similarly, the invention could be used to represent an environment for other mobile entities such as a robot. The 'cells' as represented by the neural network may be in a computer remote from the robot, or they may be within the robot moving through the environment. specifically, the representation exists in the synapses made by pairs of "CA3 pyramidal" cells, although similar representations are presumed to exist in other synaptic classes in the hippocampus. The nature of the representation is that each synapse encodes the distance between the firing fields of the pre and post synaptic place cells that make up the synapse. The synaptic strength decreases with the distance between firing fields and is maximal when the firing fields overlap. The representation comes about because the synapses are thought to be Hebbian. In this case, the synapse will strengthen if the firing fields of the pre and post synaptic cells are near each other, since the two cells will often fire at nearly the same time. In contrast, if the firing fields are far apart, the synapse will not strengthen because the mobile entity (e.g., a rat or robot) cannot move from the region of one field to the region of the other fast enough so that both cells will fire together.

How to Train a Network

Figure 5:
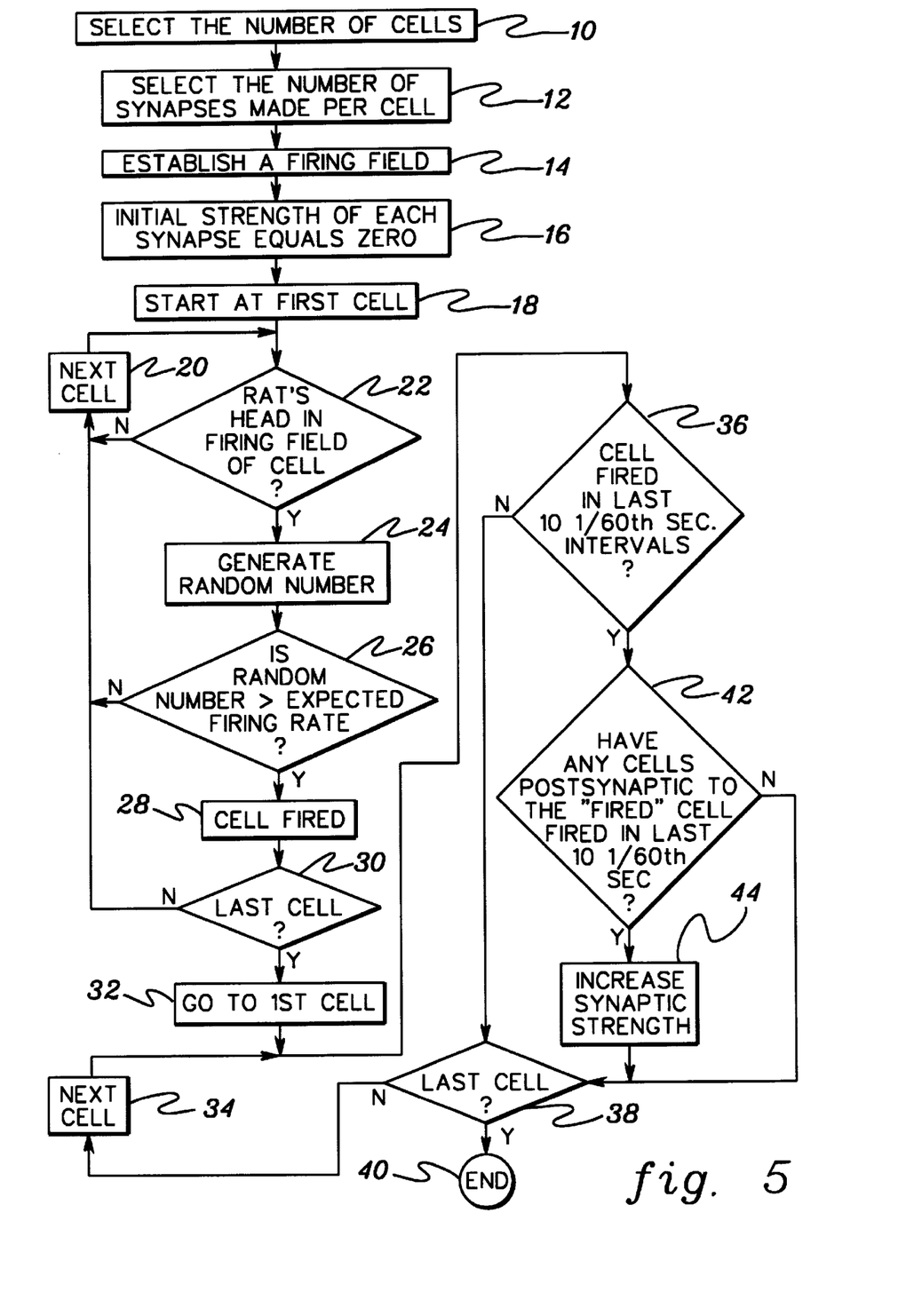
FIG. 5 shows a block diagram illustrating a preferred method for generating a representation of an environment.

A computer simulation of the network can be made with the following steps, which are also depicted in FIG. 5:

a) Select the number of cells, step 10 "SELECT THE NUMBER OF CELLS." Up to now, simulations have been run with up to about 10,000 cells, a very large number by neural network standards. This is possible because the network acts in a linear fashion during training.

b) Select the number of synapses made per cell, step 12, "SELECT THE NUMBER OF SYNAPSES MADE PER CELL." In the simulations done so far, the number of synapses is exactly the same for each cell. This is true of both "divergence", the number of synapses made by each pre synaptic cell and "convergence", the number of synapses received by each post synaptic cell.

c) Establish a "firing field" for each cell, step 14, "ESTABLISH A FIRING FIELD." This is done by randomly picking a center for the firing field and then calculating what the firing rate should be in nearby pixels according to a circular gaussian distribution.

d) Set the initial strength (weight) of each synapse to zero, step 16, "INITIAL STRENGTH OF EACH SYNAPSE EQUALS ZERO."

Steps a–d comprise initialization.

To train the network, a sequence of 57,600 positions for the rat is taken from a real recording of where a rat was every 1/60th second for 16 minutes. (57,600=60*60*16). A similar training sequence may be used that tracks the motion of a robot using a similar camera technique or real-time positional data from the robot. The following sequence is repeated for each position.

e) Start at the first cell, step 18, "START AT FIRST CELL." If the position of the rat or robot is such that its head is in the firing field of the first cell, INQUIRY 22, "RAT'S HEAD IN FIRING FIELD OF CELL?," use a random number generator, step 24, "GENERATE RANDOM NUMBER," to determine if the cell fires in the current 1/60th second. If the random number exceeds the expected firing rate in the current pixel in which the rat or robot is located, step 26, "IS RANDOM NUMBER>EXPECTED FIRING RATE?," then the cell fires, step 28, "CELL FIRES." If the rat's head was not in the firing field of the cell, INQUIRY 22, the random number was less than or equal to the expected firing rate, INQUIRY 26, or the last cell has not been reached, INQUIRY 30, "LAST CELL?," then the process is repeated for the next cell, step 20, "NEXT CELL."

f) Returning to INQUIRY 30, after the last cell has been reached, start again at the first cell, step 32, "GO TO 1ST CELL." If the cell has not fired in the last 10 1/60th second intervals, INQUIRY 36, check to see if the last cell was just processed, INQUIRY 38, "LAST CELL." If not, go on to the next cell, step 34, "NEXT CELL," and continue processing as described herein. If the cell has fired in the last 10 1/60th second intervals, see which, if any, of the cells that are post synaptic to the first cell have fired in the last 10 1/60th second intervals, INQUIRY 42, "HAVE ANY CELLS POST SYNAPTIC TO THE 'FIRED' CELL FIRED IN THE LAST 10 1/60th SEC?." For any post synaptic cell that has fired, increase the synaptic strength of the synapse, step 44, "INCREASE SYNAPTIC STRENGTH," by an amount equal to the product of the number of firings in the last 10 1/60th second intervals. Whether or not the synaptic strength was increased, check to see if the last cell was just processed, INQUIRY 38, "LAST CELL." If not, go on to the next cell, step 34, "NEXT CELL." If the last cell is processed, the process ends, step 40, "END." Note: the number of 1/60th second intervals is a variable not necessarily equal to 10. This time interval is called the LTP interval.

g) After iterations have been made over the position sequence and the cells, the network is trained.

Although preferred embodiments have been depicted and described in detail herein, it will be apparent to those skilled in the relevant art the various modifications, additions, substitutions and the like can be made without departing from the spirit of the invention and these are therefore considered to be within the scope of the invention as defined in the following claims.

What is claimed is:

1. A method for generating a representation of an environment, said method comprising the steps of:

a) selecting an environment to be represented by a plurality of place cells, said plurality of place cells being repositionable as a unit within said environment, each place cell in said plurality of place cells connected to one or more of other place cells in said plurality of place cells by a synapse, wherein two place cells of said plurality of place cells are designated as a pre synaptic place cell and a post synaptic place cell, each place cell having a firing field within said environment and firing when the plurality of place cells is located in the firing field of the place cell;

b) determining whether ether said pre synaptic place cell has fired red within a first preselected time interval, and designating said pre synaptic place cell in said environment that has fired as a fired pre synaptic place cell;

c) determining whether said post synaptic place cell has fired within a second preselected time interval, said synapse connecting said fired pre synaptic place cell to said post synaptic place cell having a synaptic strength value;

d) increasing said synaptic strength value if said post synaptic place cell has fired;

e) repeating steps b through d for other pairs of place cells of said plurality of place cells positioned within said environment;

f) generating a representation of said environment, said generating comprising encoding distances between the firing fields of the pairs of place cells connected by said synapses, said distances being represented by said synaptic strength values.

2. The method of claim 1 further comprising utilizing said representation of said environment to determine a path from an initial position in said environment to a final position in said environment.

3. The method of claim 2 wherein said path comprises a path of shortest distance between said initial position and said final position.

4. The method of claim 2 wherein said path comprises an optimum path between said initial position and said final position.

5. The method of claim 1 wherein a synaptic strength value increases as said distance decreases.

6. The method of claim 1 further comprising decreasing said synaptic strength value at step d if only said pre synaptic place cell has fired.

7. The method of claim 1 further comprising decreasing said synaptic strength value at step d if only said post synaptic place cell has fired.

8. The method of claim 1 further comprising decreasing said synaptic strength value at step d if said pre synaptic place cell and said post synaptic place cell have not fired.

9. The method of claim 1 wherein said first preselected time intervals equals said second preselected time interval.

10. A method for generating a representation of an environment, said method comprising the steps of:

a) selecting an environment to be represented by a plurality of place cells, each place cell in said plurality of place cells connected to one or more of other place cells in said plurality of place cells by a synapse, wherein two place cells of said plurality of place cells are designated as a pre synaptic place cell and a post synaptic place cell, each place cell having a firing field within said environment;

b) determining whether said pre synaptic place cell has fired within a first preselected time interval, and designating said pre synaptic place cell that has fired as a fired pre synaptic place cell;

c) determining whether said post synaptic place cell has fired within a second preselected time interval, said synapse connecting said fired pre synaptic place cell to said post synaptic place cell having a synaptic strength value;

d) increasing said synaptic strength value if said post synaptic place cell has fired;

e) repeating steps b through d for other pairs of place cells of said plurality of place cells;

f) generating a representation of said environment, said generating comprising encoding distances between the firing fields of the pairs of place cells connected by said synapses, said distances being represented by said synaptic strength values.

11. The method of claim 10 further comprising utilizing said representation of said environment to determine a path from an initial position in said environment to a final position in said environment.

12. The method of claim 11 wherein said path comprises a path of shortest distance between said initial position and said final position.

13. The method of claim 11 wherein said path comprises an optimum path between said initial position and said final position.

14. The method of claim 10 wherein a synaptic strength value increases as said distance decreases.

15. The method of claim 10 further comprising decreasing said synaptic strength value at step d if only said pre synaptic place cell has fired.

16. The method of claim 10 further comprising decreasing said synaptic strength value at step d if only said post synaptic place cell has fired.

17. The method of claim 10 further comprising decreasing said synaptic strength value at step d if said pre synaptic place cell and said post synaptic place cell have not fired.

18. The method of claim 10 wherein said first preselected time intervals equals said second preselected time interval.

* * * * *